AUTOMATIC RESTARTING AND RESETTING CIRCUIT FOR BEAM SWITCH TUBES
Filed April 8, 1965
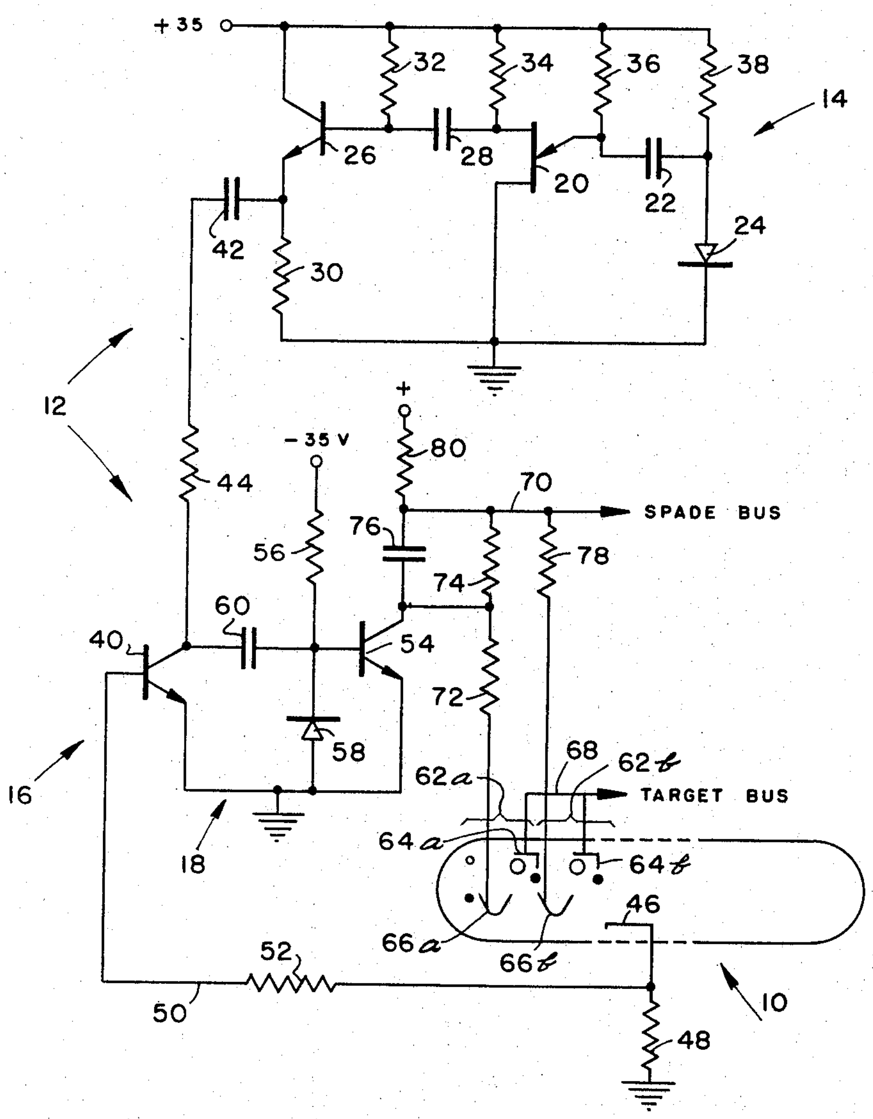
INVENTOR.
PETER V. TRYON
BY
V. C. MULLER
ATTORNEY.

United States Patent Office 3,328,630

Patented June 27, 1967

3,328,630
AUTOMATIC RESTARTING AND RESETTING CIRCUIT FOR BEAM SWITCH TUBES

Peter V. Tryon, Madison, N.J., assignor, by mesne assignments, to the United States of America as represented by the Secretary of the Navy Filed Apr. 8, 1965, Ser. No. 446,752
2 Claims. (Cl. 315—8.5)

This invention relates to a circuit for monitoring the operation of a beam switching tube, and automatically retarting the tube and resetting same to a predetermined initial operating condition, in the event of unauthorized interruption of its operation, as by temporary power failure, or the like.

In the construction of circuits for monitoring beam switching tube operation, it has been a practice, prior to the present invention, to use circuitry employing relatively high processing and output signal levels. This prior art circuitry has been of the pulse circuit type, and has provided signals typically having voltage swings of the order of 50 volts with an output power level commensurate with beam tube control requirements for the tube. These pulse circuits have been of electron tube circuit construction and have the disadvantages of consuming a significant amount of power and requiring relatively frequent preventative maintenance.

Solid state signal processing circuitry, on the other hand, is characterized by low power consumption and relative freedom from maintenance problems. However, the order of power level needed for beam tube control requirements cannot be easily developed with such solid state circuitry. As a consequence, the adaptation of circuits of solid state type of construction, for use as a monitoring circuit for beam switching tubes has, prior to the present invention, posed difficult problems.

The principal object of this invention is to provide an improved circuit for monitoring the operation of a beam switching tube and for automatically restarting the tube and resetting same to a predetermined initial condition, in the event of unauthorized interruption of beam switching tube operation.

Another object is to provide a circuit, in accordance with the previous objective, which is constructed of solid state electronic components in a manner which obviates problems in the adaptation of electronic circuits of the solid state type of construction.

Another object is to provide a circuit in accordance with the first stated objective which provides the degree of reliability required in connection with monitoring functions.

Further objects are to provide a monitoring circuit of the foregoing type which, itself, has low power consumption, and which requires little preventative maintenance.

Other objects, advantages and novel features of the invention will become apparent from the following detailed description of the invention when considered in conjunction with the accompanying drawing wherein:

The single figure is an electrical schematic of a circuit embodying the present invention. Referring in detail to the drawing, a beam switching tube 10, is provided with a monitoring network 12, of the type for automatically restarting and resetting the tube's electron beam, which monitoring network forms the subject of the invention. Monitoring network 12 is of the solid state form of electronic circuit construction and generally comprises a rectangular wave oscillator stage 14, a reset inhibiting switch stage 16, and a reset switch stage 18. In a typical operational use of a beam switching tube, it is desired that the tube be automatically restarted with predetermined initial conditions in the event the tube ceases to operate due to power supply failure, or the like, and the present invention serves to provide this function.

Rectangular wave oscillator stage 14 comprises a "*p*" type unijunction transistor device 20, and a capacitor charge circuit including a capacitor 22 having one of its sides connected to circuit ground through a diode 24. The "base-one" electrode of the unijunction is connected to circuit ground and the capacitor and diode are connected between the emitter electrode and circuit ground with the diode poled with its cathode grounded. The signal at the "base-two" electrode of the unijunction device is coupled to the base of an NPN type transistor 26 through a coupling capacitor 28. The collector of transistor 26 is connected to a conventional source of positive voltage for operating a transistor, and a load resistor 30 is connected between the emitter and ground, forming a common collector configuration stage at the output of the oscillator. Resistors 32, 34, 36 and 38 are connected between the positive voltage source and the base of transistor 26, the "base-two" electrode of unijunction 20, the emitter of unijunction 20, and the anode of diode 24, respectively. A unijunction rectangular wave oscillator circuit of this type is conventional and is described at page 198 of the "Transistor Manual," 6th edition, 1962, published by the Semiconductor Products Department of the General Electric Company, Electronic Park, Syracuse, N.Y. The circuit values are chosen to provide an output frequency in the range of 1,000–2,000 cps. The buffering transistor 26 is normally forward biased through resistor 32, and is turned "off" by the low portion of the rectangular wave output waveform from the unijunction stage. During the high portion of each rectangular wave cycle, transistor 26 is conducting heavily and its emitter is practically at the potential of the positive power supply.

The reset inhibiting switch stage 16 comprises an NPN transistor 40 having its emitter connected to circuit ground and its collector connected to the emitter of transistor 26 through a coupling capacitor 42, with a current limiting resistor 44 series connected between the collector and the capacitor. The beam switching tube 10 has a cathode 46, which is connected to ground through a dropping resistor 48 of a value chosen to provide a potential thereacross, which is sufficient to forward bias transistor 40 during normal flow of cathode current through tube 10, and this potential is applied to the base of transistor 40 via a lead 50. If desired, a current limiting resistor 52 of suitable value may be series connected in lead 50.

The reset switch stage 18 comprises an NPN transistor 54 of a type having a sufficient voltage rating between its emitter and collector to accommodate the voltage levels employed as operating potentials for the beam switching tube 10. The base of the transistor 54 is connected to a conventional source of negative voltage for operating a transistor through a resistor 56 of relatively large value (in the order of one megohm), and a diode 58 is connected between the base and ground with its cathode side connected to the transistor base. Diode 58 is thus poled in the circuit with its direction of forward current flow between the base and ground opposite to the forward direction of current flow across the base and emitter junction of the transistor 54. The signal appearing at the collector of transistor 40 is coupled to the base of transistor 54 through a coupling capacitor 60, which also serves to isolate transistor 54 and diode 58 from contact potential effects of transistor 40. The diode 58 clamps the negative potential normally appearing at the base of transistor 54 to a level which reverse biases transistor 54. However, when a positive portion of the square wave signal from oscillator 14 appears at the collector of transistor 40, this positive signal is coupled through capacitor 60 and back biases diode 58, and causes transistor 54 to conduct. Resistor 56 is sufficiently large in value to provide a high impedance input at the base of transistor 54 in the presence of positive polarity signals at the collector of transistor 40.

Beam switching tube 10 is of a conventional type having a sequential series of target and beam control electrode sets 62*a*, 62*b*, etc., of which only the first two sets are shown. Each set includes a target electrode 64 and a spade electrode 66. The target electrodes 64*a*, 64*b*, etc., are connected to a suitable positive D.C. operating potential through a target bus line 68. The spade electrode 66*a* of the first electrode set 62*a*, is connected to a spade operating potential bus line 70 through a pair of series connected resistors consisting of a first resistor 72 having one of its ends connected to the spade electrode 66*a*, and a second resistor 74 connected between bus line 70 and the other end of resistor 72. A capacitor 76 is connected in parallel circuit relationship with resistor 74, and the collector of transistor 54 is connected to the common circuit junction point where the ends of resistors 72 and 74 and one side of capacitor 76 are connected together. The spade electrodes of the other electrode sets are connected to the spade bus line through single resistors, of equal value, individually disposed between each spade electrode and the spade bus line 70. Exemplary of such single resistors is resistor 78 connected to spade 66*b* of the second electrode set 62*b*. The spade bus line 70 is connected to a positive source of potential through a limiting resistor 80. The circuit network consisting of resistors 72, 74, 78 and 80, and capacitor 76 is a conventional network used in conventional circuits for manually restarting a beam switching tube and resetting its electron beam tube to flow from the cathode 46 to target electrode 64*a* of the first electrode set 62*a*. In the operation of this type of conventional manual reset circuit a normally opened manual switch is connected from the junction of resistors 72, 74, and capacitor 76, to ground, and the operator causes the switch to be momentarily closed to restart the tube and reset the beam. Such a manual reset circuit and its operation are described at page 10 of Brochure BX535A, published by the Burroughs Corporation, Plainfield, New Jersey, and entitled "Burroughs Beam-X Switch."

The operation of automatic monitoring network 12 is as follows: If the beam switching tube 10 is properly operating, current is flowing through its cathode 46, and the potential across dropping resistor 48 drives transistor 40 into saturation, shorting any output from oscillator circuit 14 to ground. However, if the electron beam within tube 10 should become extinguished, as the result of a temporary power failure, or the like, no forward bias is applied to transistor 40, and its collector impedance becomes very large, permitting the output pulses of oscillator circuit 14 to pass to the base of transistor 54. The positive portion of the pulse waveform forward biases transistor 54 into a condition of heavy conduction, which momentarily short circuits the junction points of resistors 72, 74 and capacitor 76 to ground to restart and reset the beam in essentially the same manner as in aforementioned manual resetting arrangement.

An important feature of the invention is that the specific circuit construction of the inhibitor switch stage 16, and particularly of the reset switch stage 18, provides positive and reliable switching action for controlling the relatively higher power level circuitry for controlling the beam switching tube. Moreover, this reliable switch action is obtained in response to the relatively low power level of signal that can be developed across the beam tube's cathode resistor. This circuitry permits the small signal appearing across resistor 48, which involves voltage swings of the order of one volt peak-to-peak, or less, to actuate the beam tube control circuit in the foolproof manner required of monitoring circuits. Among the factors which significantly contribute to the high reliability of operation of stage 18 is the reliable manner in which transistor 54 is kept back biased by the conventional source of negative transistor operating potential and the clamping diode 58, and the manner in which capacitor 60 serves to isolate diode 58 and transistor 54 from the contact potential effects exhibited by transistor 40.

The following list of components is included by way of example of the type and values of circuit components in a specific embodiment of monitoring circuit 12.

| Component | Numeral | Type or Value |
|---|---|---|
| Beam Switch Tube | 10 | BX1000. |
| Unijunction Transistor | 20 | 2N491 (Silicon type). |
| Capacitor | 22 | 0.1 μf. |
| Diode | 24 | 1N69 (Germanium type). |
| Transistors | 26, 40 | 2N338 (Silicon type). |
| Capacitors | 28, 42, 60 | 10 μf. |
| Resistor | 30 | 3.9K. |
| Do | 32 | 330K. |
| Do | 34 | 1.8K. |
| Do | 36 | 5.6K. |
| Do | 38 | 15.0K. |
| Do | 44 | 2.2K. |
| Do | 48 | 680Ω. |
| Do | 52 | Suitable value. |
| Transistor | 54 | 2N699 (Germanium type). |
| Resistor | 56 | 1.0 megohm. |
| Diode | 58 | 1N252 (Silicon type). |

The circuit component values for resistors 72, 74, 78, and 80, and for capacitor 76, are readily calculatable from formulas given at pages 9 and 10 of the above referenced Brochure BX535A, of the Burroughs Corporation.

Obviously many modifications and variations of the present invention are possible in the light of the above teachings. It is therefore to be understood that within the scope of the appended claims the invention may be practiced otherwise than as specifically described.

What is claimed is:

1. In combination with a beam switching tube of the type having a cathode electrode and a sequential series of target and beam control electrode sets and operative to form an electron beam from the cathode to a target electrode of one individual set of said series of sets, each electrode set also containing a spade electrode, and the spade electrode of the first set of said series being connected to a first end of a parallel resistance and capacitance network formed by a resistor and a capacitor connected in parallel circuit relationship, the opposite end of said parallel resistance and capacitance network being connected to a D.C. operating potential supply line, said switching tube being adapted for synchronously starting the flow of said electron beam and resetting of the beam to a position from the cathode to the target of said first set in response to momentarily causing a substantially short circuit connection between said first end of the parallel resistance and capacitance network and circuit ground;

(a) a first transistor switch forming an alternatively opened or closed switch path between its emitter and collector electrodes, said switch path shunt connecting said first end of the parallel resistor and capacitor network and ground, said first transistor switch being of the high voltage rating type adapted for operating potentials of a level commensurated with the potential of said supply line, (b) a pulsed signal source for forward biasing the base and emitter junction of said first transistor switch, (c) a second transistor switch forming an alternatively opened or closed switch path between its emitter and collector electrodes, said switch path shunt connecting the output of said signal source and ground to inhibit forward biasing of said second transistor switch when the second transistor switch is forward biased, (d) said cathode of the beam switching tube being connected to circuit ground through a dropping resistor to provide at said cathode a potential for forward biasing the base and emitter junction of said second transistor switch, and (e) means for applying the potential at said cathode to the base of said second transistor switch, whereby the second transistor switch inhibits application of the output of said signal source as long as said electron beam is flowing from the cathode of the beam switching tube and upon any cessation of flow of the electron beam the second transistor switch allows the pulsed output signal from said signal source to momentarily forward bias said first transistor switch to restart and reset the electron beam.

2. Apparatus in accordance with claim 1, and (f) a network for normally reverse biasing the base and emitter junction of said first transistor switch comprising, a signal coupling and D.C. contact potential isolation capacitor connected between the output of the pulsed signal source and the base of the first transistor switch, a source of potential for back biasing the base and emitter junction of said first transistor source and means for applying said potential to the base of said first transistor switch, and a semiconductor diode device connected between the base of said first transistor switch and circuit ground and so poled that it is forward biased by said source of potential, but becomes back biased by said pulsed signal for forward biasing the first transistor switch, whereby application the signal at the output of the signal source to the base of the first transistor switch is positively inhibited by the contact potential across the diode device when the switch path of the second transistor switch is in its closed switch condition, and the diode device and the base and emitter junction of the first transistor is positively isolated from the contact potential effects of the base and emitter junction of the second transistor switch, but with the first transistor switch responsive to said pulsed signal to cause the aforementioned short circuiting to ground when electron beam current is not flowing through the cathode of the beam switching tube.

References Cited

UNITED STATES PATENTS

| | | | |
|---|---|---|---|
| 3,079,528 | 2/1963 | Somlyody | 315—8.5 |
| 3,168,674 | 2/1965 | Somlyody | 315—8.5 |

JAMES W. LAWRENCE, *Primary Examiner.*

V. LAFRANCHI, *Assistant Examiner.*